2,697,045

PLASTICIZED CELLULOSE ESTERS AND ETHERS

Stanford J. Hetzel, Cheltenham, Pa., assignor to Sun Oil Company, Philadelphia, Pa., a corporation of New Jersey No Drawing. Application December 1, 1950, Serial No. 198,737

9 Claims. (Cl. 106—180)

This invention relates to cellulose esters and ethers plasticized with 1,5-pentanediol diesters of monocarboxylic aromatic acids.

According to the present invention, plasticized cellulose derivatives are prepared by intimately admixing a cellulose derivative with a 1,5-pentanediol diester of an aromatic monocarboxylic acid having not more than 20 carbon atoms.

1,5-pentanediol diesters of acids as specified above can be prepared by esterification of a 1,5-pentanediol in any of the ways disclosed in my copending applications for patent Serial No. 183,628, filed September 7, 1950, and 190,639, filed October 17, 1950, disclosing and claiming 1,5-pentanediol diesters of the general type contemplated herein and also vinyltype polymers plasticized with such diesters. For example, 1,5-pentanediol dibenzoate can be prepared by refluxing together approximately stoichiometric proportions of 1,5-pentanediol and benzoic acid in the presence of xylene and para-toluene sulfonic acid, and recovering 1,5-pentanediol dibenzoate by vacuum distillation from the reaction products. Other preparation methods can be used.

A 1,5-pentanediol, as herein contemplated, is a compound containing a straight chain of five carbon atoms having one hydroxyl substituent on each of the terminal carbon atoms of the chain. The compound, in addition to the two hydroxyl substituents, can also have other non-interfering substituents, e. g. alkyl, alkoxy, etc. Examples of 1,5-pentanediols contemplated here are: 3,4-dimethyl - 1,5-pentanediol; 2,4-dimethyl-2-methoxymethyl-1,5-pentanediol; 2-ethyl-1, 5-pentanediol; 3-methoxy-2-methyl-1,5-pentanediol; etc. Esters of the compound 1,5-pentanediol are preferred compounds for use according to the invention.

1,5-pentanediol diesters used to plasticize cellulose esters and ethers can be diesters of aliphatic monocarboxylic acids having 6–20 carbon atoms, e. g. caproic, enanthic, caprylic, pelargonic, capric, hendecanoic, lauric, myristic, stearic, palmitic, arachidic, glycollic, lactic, hendecenoic, oleic acid, etc. The diesters used according to the invention, to plasticize cellulose esters and ethers, are 1,5-pentanediol diesters of aromatic monocarboxylic acids; the term, aromatic acid, is intended here to include both carboxylic acids having no aliphatic substituents and carboxylic acids having both an aromatic and an aliphatic portion in the molecule; the carboxyl group can be attached either to the aromatic portion of the molecule, as in benzoic, toluic, xylic, benzoylbenzoic, naphthoic, anthroic, ethylbenzoic acid, etc., or to the aliphatic portion of the molecule, as in phenylacetic, betaphenylpropionic, alphaphenylpropionic, phenylbutyric, diphenylacetic, phenoxyacetic, phenylglycollic, phenyllactic, alphanaphthylacetic acid, etc. Carboxylic acids, used according to the present invention, preferably have less than 10 carbon atoms, since 1,5-pentanediol diesters of such acids are compatible in greater proportions with cellulose derivative than are 1,5-pentanediol diesters of acids having 10 or more carbon atoms. However, diesters of acids having 10 or more carbon atoms are suitable for use in many instances where large quantities of plasticizer are not required.

Examples of 1,5-pentanediol diesters which can be used according to the invention are: 3-methoxy-2-methyl-1,5-pentanediol dibenzoate; 1,5-pentanediol dixylate; 1,5-pentanedial dinaphthoate; 1,5-pentanediol di(phenylacetate); 1,5-pentanediol di(alphaphenylpropionate); 3-methoxy-2-methyl-1,5-pentanediol di(diphenylacetate); 1,5-pentanediol di(alphanaphthylacetate); 1,5-pentanediol di(phenoxyacetate); etc.

According to the invention, 1,5-pentanediol diesters as above specified are used to plasticize cellulose derivatives, e. g. cellulose esters such as cellulose acetate, propionate, butyrate, isobutyrate, crotonate, or acetate-butyrate (aceto-butyrate), etc., or cellulose ethers such as benzyl cellulose, ethyl cellulose, glycol cellulose, etc. It has been found that cellulose derivatives plasticized with such diesters have generally excellent properties in that they are permanently plasticized to a satisfactory degree of softness and flexibility, and in that they exhibit good tensile strength, good plasticizer retention under various conditions, and other advantageous properties.

Plasticized cellulose derivatives according to the invention have many uses, for instance in coating or plastic compositions, with or without solvents such as esters, alcohols, hydrocarbons, mixed solvents, etc.; many other uses of plasticized cellulose derivatives are known to the art.

1,5-pentanediol diesters can be used, according to the invention, together with other known plasticizers as, for instance dibutyl phthalate.

The proportion of 1,5-pentanediol diester to cellulose derivatives in compositions according to the invention can vary widely. Generally the invention contemplates compositions containing at least about 5 and preferably at least about 25 parts of diester per 100 parts of cellulose derivative. The maximum amount of diester, which can be used, differs from one diester to another and can be determined in the light of the present specification by a person skilled in the art.

According to the present invention, cellulose derivatives are admixed in any suitable manner with 1,5-pentanediol diesters as specified above. For example, plasticized sheets of cellulose acetate-butyrate can be prepared by milling together cellulose acetate-butyrate and the desired amount of 1,5-pentanediol diester on heated rolls, then molding the resulting milled sheet to the desired shape. Other mixing methods can be used.

The following example illustrates the invention:

Example

In this example, a composition comprising cellulose acetate-butyrate plasticized with 1,5-pentanediol dibenzoate was prepared. 80 parts by weight of Tenite II Formula 268 Grade MS, a commercial cellulose acetate-butyrate, were mixed together at about 300° F. with about 40 parts by weight of 1,5-pentanediol dibenzoate and the mass stirred thoroughly until good mixing was obtained. This mass was then milled for about 30 minutes on a 3" x 8" rubber mill whose rolls were heated to about 300° F. The mass fused together on the rolls and was sheeted off at 250° F. to give a plastic sheet comprising 100 parts by weight of cellulose acetate-butyrate and about 50 parts by weight of 1,5-pentanediol dibenzoate. Part of this sheet was molded for 5 minutes at 300° F. and 2,000 lbs./sq. in. in a 5¾" square steel mold to give a molded sheet about 0.045 inches thick. This sheet was permanently flexible and consisted of cellulose acetate-butyrate and 1,5-pentanediol dibenzoate in mutually compatible admixture. This sheet was found to have the following properties:

| | |
|---|---|
| Tensile strength (Scott ASTM D 412–41) lb./sq. in. | 1150 |
| Elongation at break _____ per cent | 50 |
| Shore hardness (instantaneous) _____ | 82 |
| Weight loss after 72 hours at 180° F_____ | 1.68 |

This example shows that 1,5-pentanediol dibenzoate is compatible in large quantities with cellulose acetate-butyrate and plasticizes the latter to give a strong flexible sheet with good plasticizer retention and other properties.

Although 1,5-pentanediol diester of benzoic acid is used above as an example of diesters which can be used to plasticize cellulose derivatives, substantially similar results are obtained when other diesters within the scope of the invention are used, e. g. 1,5-pentanediol dixylate, 1,5-pentanediol di(phenylacetate), 1,5-pentanediol di(phenoxyacetate), etc., there being, however, in some cases differences in the maximum amounts of different diesters which are permanently compatible with the cellulose derivative.

Also, although cellulose acetate-butyrate is given as an example of a cellulose derivative which can be plasticized according to the present invention, substantially similar results are obtained when other cellulose derivatives are thus plasticized, e. g. cellulose acetate, cellulose isobutyrate, ethyl cellulose, etc., there being however, in some cases, differences in the maximum amounts of a diester which are permanently compatible with different cellulose derivatives.

In applicant's copending application Serial No. 183,628, filed September 7, 1950, vinyl polymers plasticized with diesters of 1,5-pentanediol and aromatic monocarboxylic acids having the carboxyl group joined directly to the aromatic ring are disclosed and claimed. In copending application Serial No. 280,183, filed April 2, 1952, by the instant inventor, now abandoned, esters of 1,5-pentanediol and certain aliphatic and aromatic monocarboxylic acids are disclosed and claimed. In copending application Serial No. 321,511, filed November 19, 1952, by the instant inventor, vinyl polymers plasticized with 1,5-pentanediol diesters of aryl-substituted aliphatic monocarboxylic acids having 2 to 5 carbon atoms in the aliphatic portion of the molecule are disclosed and claimed. In copending application Serial No. 252,975, filed October 24, 1951, by the instant inventor, rubber-like butadiene-acrylonitrile copolymers plasticized with esters of 1,5-pentanediol and certain derivatives thereof and monocarboxylic acids having 5 to 20 carbon atoms inclusive are disclosed and claimed.

I claim:

1. A cellulose derivative selected from the group consisting of cellulose esters and ethers containing only carbon, hydrogen, and oxygen in the molecule, plasticized with a 1,5-pentanediol diester of a monocarboxylic aromatic acid having less than 21 carbon atoms.
2. Composition according to claim 1 wherein said diester is 1,5-pentanediol dibenzoate.
3. Composition according to claim 1 wherein said monocarboxylic aromatic acid is an acid having less than 10 carbon atoms.
4. Composition according to claim 1 wherein said diester is 1,5-pentanediol di(phenylacetate).
5. Composition according to claim 1 wherein said cellulose derivative is cellulose acetate-butyrate.
6. Composition according to claim 1 wherein said diester is 1,5-pentanediol ditoluate.
7. Composition according to claim 1 wherein said diester is 1,5-pentanediol dixylate.
8. Composition according to claim 1 wherein said diester is 1,5-pentanediol di(phenoxyacetate).
9. Cellulose acetate-butyrate plasticized with a 1,5-pentanediol diester of an aromatic monocarboxylic acid having less than 10 carbon atoms.

References Cited in the file of this patent

UNITED STATES PATENTS

| Number | Name | Date |
|---|---|---|
| 2,151,476 | Kimble | Mar. 21, 1939 |
| 2,341,464 | Meyer | Feb. 8, 1944 |
| 2,412,469 | Nicholl | Dec. 10, 1946 |
| 2,476,976 | Grunfeld et al. | July 26, 1949 |
| 2,592,234 | Bell | Apr. 8, 1952 |

FOREIGN PATENTS

| Number | Country | Date |
|---|---|---|
| 468,533 | Great Britain | July 7, 1937 |
| 432,264 | France Addition 19,685 | May 5, 1915 |
| 144,030 | Austria | Dec. 27, 1935 |

OTHER REFERENCES

"Official Digest of the Federation of Paint & Varnish Production Clubs," 1945, pages 493–496.

"Tenite Specifications" (1944), Tennessee Eastman Corp., Kingsport, Tennessee, pages 3 to 6 and 16 to 24.